United States Patent [19]

Matsushita et al.

[11] Patent Number: 5,324,117
[45] Date of Patent: Jun. 28, 1994

[54] LAMINATED RUBBER BEARING

[75] Inventors: Hiroomi Matsushita; Kazuhiro Fujisawa; Teruo Sasaki, all of Kobe, Japan

[73] Assignee: Sumitomo Rubber Industries, Ltd., Hyogo, Japan

[21] Appl. No.: 102,215

[22] Filed: Aug. 5, 1993

[30] Foreign Application Priority Data

Aug. 7, 1992 [JP] Japan .................................. 4-211145
Oct. 30, 1992 [JP] Japan .................................. 4-292649

[51] Int. Cl.$^5$ .......................... E04B 1/98; E04H 9/02
[52] U.S. Cl. ........................................ 384/36; 14/73.5; 52/167 E
[58] Field of Search ................ 384/36, 222, 221; 14/73.5; 52/167 E, 167 EA

[56] References Cited

U.S. PATENT DOCUMENTS

| | | | |
|---|---|---|---|
| 4,033,005 | 7/1977 | Czernik et al. | 14/73.5 |
| 4,718,206 | 1/1988 | Fyfe et al. | 384/36 X |
| 5,201,155 | 4/1993 | Shimoda et al. | 52/167 E |

FOREIGN PATENT DOCUMENTS

| | | |
|---|---|---|
| 0287683 | 10/1988 | European Pat. Off. . |
| 411876 | 2/1991 | European Pat. Off. ........... 52/167 E |
| 2921828 | 12/1979 | Fed. Rep. of Germany . |
| 2602293 | 2/1988 | France . |
| 254933 | 4/1990 | Japan . |
| 674762 | 7/1952 | United Kingdom . |

*Primary Examiner*—Thomas R. Hannon
*Attorney, Agent, or Firm*—Nikaido, Marmelstein, Murray & Oram

[57] ABSTRACT

A laminated rubber bearing comprising a columnar-shaped viscoelastic body 5, a plurality of viscoelastic members 4, and an external binding body 1 disposed in the periphery of these components. The external binding body 1 is a laminated body consisting of alternating rigid plates 3 and rubber-like elastic plates 2 with rubber-like elastic plates 2 disposed between external peripheral regions of the rigid plates 3. The viscoelastic members 4 are disposed inside of those rubber-like elastic plates 2 of the external binding body 1 so that the viscoelastic members 4 fill up clearance between the rigid plates 3 inside of respective rubber-like elastic plates 2. A cylindrical cavity 6 open at both ends thereof extends through the viscoelastic members 4 and the rigid plates 3. A viscoelastic body 5, an elastic body, or viscous substance having cubage greater than that of the cylindrical cavity 6 is forcedly inserted in the cylindrical cavity 6.

4 Claims, 9 Drawing Sheets

LAMINATED RUBBER BEARING

BACKGROUND OF THE INVENTION

The present invention relates to a laminated rubber bearing. More particularly, the invention relates to a peripheral-binding type laminated rubber bearing which is capable of supporting a variety of structures including buildings, bridges, tanks, or the like, or precision apparatuses including computers, medical-treatment apparatuses, security apparatuses, high-precision machine tools, analytical apparatuses, or the like, or artifacts, in the state of stably mounting those objects thereon in order to minimize acceleration incurred from earthquake, mechanical vibration, or traffic vibration, for example.

For instance, conventionally, there is such a laminated rubber bearing used for decreasing acceleration transmitted to those structures, precision apparatuses, or artifacts cited above by way of functioning as a vibration-proof supporter. This conventional laminated rubber bearing has a structure composed of alternately laminated rigid plates made of steel and soft rubber-like elastic plates having negligible effect of compressive permanent strain. This conventional laminated rubber structure is disposed between upper and lower structures to swingably support the upper structure in the horizontal direction in order to decrease acceleration incurred from earthquake and protect the upper structure from destructive force generated by earthquake.

As is apparent from the above description, damping performance and stability against vertical load (hereinafter referred to as "buckling-proof" performance) are extremely important factors in any of those laminated rubber bearings used for protection against destructive force generated by earthquake. Examples of damping performance and buckling-proof performance of conventional laminated rubber bearings are described below.

If a laminated rubber bearing were inappropriate in the damping performance, then, it will not be able to exert enough capability to fully absorb vibration energy in actual service. This means that it will take a long while before horizontal swing movement generated by vibration can fully be terminated, and thus, this bearing is inadequate for practical service. Therefore, in order to promote damping performance, in addition to such a laminated rubber bearing, external dampers are conjunctionally used. In addition, there is such a newly developed laminated rubber bearing using rubber-like plates made from high-damping rubber. Details of such a newly developed laminated rubber bearing incorporating practical means for promoting damping performance are described below.

A conventional laminated rubber bearing disclosed in the Japanese Patent Publication No. 60-47417 has such a structure containing space in the structural contour of rubber-like elastic plate layers, where the space is filled with viscoelastic substance. In consequence, vibration-damping performance is promoted by means of deforming energy of the internally accommodated viscoelastic body.

Another conventional laminated rubber bearing disclosed in the Japanese Laid-Open Patent Publication No. 64-58370 has such a peripheral-binding type structure capable of exerting high rigidity in the vertical direction and high potential for supporting load in the state of exerting substantial deforming capability in the horizontal direction by filling a through-hole with a columnar viscoelastic body to hold this body with a peripheral binding body. In addition, the peripheral binding body and/or the viscoelastic body are respectively capable of absorbing vibration energy mainly generated by frictional attenuation.

Another conventional laminated rubber bearing disclosed in the Japanese Laid-Open Utility Model No. 2-54933 has such a structure described below. An elastic supporter is formed by alternately laminating a plurality of rigid plates made of steel and a plurality of elastic plates made of soft rubber. Viscous substance is accommodated in a through-hole extending in the axial direction of the elastic supporter. The viscous substance and the elastic substance are nipped by an upper plate an d a lower plate. The viscous substance integrated with these components is interposed between an objective structure and a supporter used for supporting the objective structure. Those steel plates respectively have inner circumferential surfaces extending to the interior of the through-hole. This structure increases tangential area between those steel plates and the viscous substance, thus resulting in the intensified frictional force and promoted damping capability.

Next, buckling-proof performance is described below. If buckling-proof performance of a laminated rubber bearing were inappropriate, then, the bearing will be subject to buckling caused by vertical load after being sheared by destructive force of earthquake. Critical buckling point of this bearing is determined based on the relationship between the displacement of the sheared supporter and horizontal load when shearing occurs. When displacement caused by shearing exceeds the critical buckling point, the effect of displacement caused by shearing is quite noticeable. Therefore, such a conventional laminated rubber bearing apt to be subject to buckling may incur grave damage not only to the bearing itself but also to the structure mounted thereon, and therefore, such a conventional laminated rubber bearing cannot be offered for use in practical fields. In the case of such a conventional peripheral-binding type laminated rubber bearing comprising alternately laminated rigid plates and rubber-like elastic members and a through-hole formed in the direction of height of the laminated body, buckling-proof performance is gravely affected by secondary shape factor and inner diameter of the through-hole permeating the rigid plates. Concretely, the conventional laminated rubber bearing is subject to buckling when a negligible amount of shearing displacement takes place in such a case in presence of a small value of secondary shape factor or in such a case in presence of a large proportion of the inner diameter of the through-hole against outer diameter of the rigid plates.

Referring to the relationship between damping performance and buckling-proof performance of the peripheral-binding type conventional laminated rubber bearing having a through-hole of the rigid plates filled with a viscoelastic body and plastic substance, if inner diameter of the through-hole were expanded in order to accommodate a greater amount of viscoelastic or plastic substance merely for promoting damping performance, then, it will conversely degrade buckling-proof performance. In consequence, such a conventional laminated rubber bearing cannot be offered for practical service. On the other hand, if the inner diameter of the through-hole were contracted for promoting buckling-proof performance, then, it will result in the contracted cubage or volume of the viscoelastic body or the plastic substance. In consequence, this conventional laminated rubber bearing cannot secure the needed damping performance. In this way, magnitude of the inner diameter of the through-hole inversely affects the damping performance and the buckling performance in contradiction to each other.

For example, another conventional laminated rubber bearing disclosed in the Japanese Laid-Open Patent Publication No. 3-163231 has such a structure described below. By effect of filling a through-hole with a viscoelastic body having cubage greater than that of the through-hole of the laminated body, the viscoelastic body having free surface being bound in the inner surface of the through-hole swells towards the rubber-like elastic plates by such an amount corresponding to surplus cubage. Expansion of the viscoelastic body between rigid plates enables viscoelastic substance to fully adhere to the inner peripheral surface of the through-hole. This in turn results in the satisfactory mechanical coupling effect between the viscoelastic substance and the laminated body, thus promoting buckling-proof performance while properly maintaining high damping performance.

The above-cited Japanese Laid-Open Patent Publication No. 64-58370 also discloses structure of another laminated rubber bearing, where a viscoelastic body filled in a through-hole comprises a laminated viscoelastic body composed of alternately laminated viscoelastic bodies and rigid plates. This structure promotes both the damping performance and the buckling-proof performance.

On the other hand, those conventional laminated rubber bearings cited above respectively have technical problems to solve, details of which are described below.

The above-cited Japanese Patent Publication No. 60-47417 discloses such a laminated rubber bearing incorporating a viscoelastic body inserted between a plurality of steel plates in order to generate damping performance. However, according to the structure disclosed therein, unlike the one disclosed in the above-cited Japanese Laid-Open Patent Publication No. 3-163231, this structure cannot fill the viscoelastic body between each steel plate by way of exceeding cubage, and therefore, clearance is generated in the inserted viscoelastic body. This in turn lowers capability of the laminated rubber bearing to support vertical load, buckling-proof performance, and absorption of energy generated by shearing deformation. Furthermore, the Japanese Laid-Open Patent Publication No. 3-163231 discloses a technique to fill viscous substance between respective steel plates in order to generate damping performance. However, introduction of the viscous substance does not significantly contribute to the damping constant, and thus, this conventional laminated rubber bearing cannot generate substantial damping effect.

Referring to the conventional laminated rubber bearing disclosed in the above-cited Japanese Laid-Open Patent Publication No. 64-58370, as mentioned earlier, dimension of inner diameter of a through-hole formed in the bearing inversely affects the damping performance and the buckling-proof performance in contradiction to each other, and thus, there is a certain limit in the improvement of the damping performance while properly maintaining buckling-proof performance effective for practical service.

On the other hand, referring to the conventional laminated rubber bearing disclosed in the above-cited Japanese Laid-Open Utility Model No. 2-54933, it accommodates viscous substance in a through-hole extending in the axial direction of an elastic supporter, and in addition, both the viscous substance and the elastic supporter are merely nipped by an upper plate and a lower plate without filling a viscoelastic body by way of exceeding cubage of the through-hole formed therein. Therefore, like the one disclosed in the Japanese Patent Publication No. 60-47417 described earlier, structure of this conventional laminated rubber bearing causes buckling-proof performance to be degraded. Furthermore, since this conventional laminated rubber bearing merely uses viscous substance, it is quite apparent that this system can hardly be offered for practical service by way of fully enhancing damping performance thereof.

Finally, referring to the conventional laminated rubber bearing disclosed in the above-cited Japanese Laid-Open Patent Publication No. 3-163231, in the event that such an extremely disastrous earthquake ever occurs like the "Kanto Earthquake" which occurred on Sep. 1, 1923, by directly striking Tokyo and surrounding Kanto area of Japan and generated approximately 25 through 30 cm of shearing deformation and 150% through 180% of shearing strain, due to flow of viscoelastic substance, cavity can easily be generated inside of the viscoelastic body, and therefore, the above conventional laminated rubber bearing cannot substantially improve buckling-proof performance suited for practical service. At the same time, structure of this conventional laminated rubber bearing lowers proportion in the shearing and deformation of the viscoelastic body, thus lowering both the energy-absorptive capability and the damping performance. Furthermore, while making use of the laminated type viscoelastic body disclosed in the above-cited Japanese Laid-Open Patent Publication No. 3-163231, height of all the rigid plates built in this laminated type viscoelastic body must fully be arranged to be flush with the rigid plates of the laminated body. If they were not fully flush with each other, then, the viscoelastic body cannot fully swell itself towards the rubber-like elastic plates to result in the difficulty to achieve satisfactory mechanical coupling condition to eventually lower buckling-proof performance.

SUMMARY OF THE INVENTION

Therefore, the invention has been achieved to fully solve those technical problems described above. The object of the invention is to provide an improved laminated rubber bearing capable of securely promoting buckling-proof performance and damping performance as well.

To achieve the above object, the invention provides an improved laminated rubber bearing comprising an external binding body comprising a plurality of alternating rigid plates and rubber-like elastic plates between outer peripheral regions of the rigid plates, a plurality of viscoelastic members disposed inside of the rubber-like elastic plates of the external binding body and between the rigid plates, a cylindrical cavity extending through the viscoelastic members and rigid plates and opening at both ends thereof, and a viscoelastic body having a volume greater than that of the cylindrical cavity and forced into the cylindrical cavity.

According to another aspect of the invention, the laminated rubber bearing is characterized by the provision of an external binding body comprising a plurality of alternating rigid plates and rubber-like elastic plates with the rubber-like elastic plates between outer peripheral regions of those rigid plates, a plurality of viscoelastic members disposed inside of the rubber-like elastic plates of the external binding body and between the rigid plates, a cylindrical cavity extending through the viscoelastic members and the rigid plates, and an elastic or viscous substance having volume greater than that of the cylindrical cavity and being forced into the cylindrical cavity.

When forcing the viscous substance into the cylindrical cavity, it is desired that a diffusion preventive film be interposed between the viscoelastic members and the viscous substance.

The laminated rubber bearing according to the invention contracts inner diameter of a plurality of rigid plates (in other words, inner diameter of the cylindrical cavity) by filling clearance between respective rigid plates inside of those rubber-like elastic plates with viscoelastic members, thus securely achieving improved buckling-proof performance. Furthermore, since the viscoelastic members are positioned between inner peripheral regions of those rigid plates, shearing deformation of respective viscoelastic members is dominant, and therefore, energy-absorptive capability can be promoted mainly by effect of frictional attenuation. Furthermore, since either the viscoelastic body, or the elastic body, or the viscous substance having volume greater than that of the cylindrical cavity is forced into the cylindrical cavity, either the viscoelastic body, or the elastic body, or the viscous substance, swells towards the viscoelastic members between the rigid plates before eventually swelling itself into rubber-like elastic plates. As a result, satisfactory mechanical coupling condition is generated between the viscoelastic members disposed between respective rigid plates and the rubber-like elastic plates. This in turn significantly promotes capability to absorb energy from shock, thus securely promoting damping performance.

BRIEF DESCRIPTION OF THE DRAWINGS

FIGS. 1a and 1b respectively illustrate the laminated rubber bearing according to an embodiment of the invention, wherein FIG. 1a a sectional view taken along line I through I of FIG. 1b, whereas FIG. 1b is a vertical sectional view thereof;

FIG. 5 is a sectional view designating the actual service condition of the laminated rubber bearing with the viscoelastic body of non-bridge structure forced into the cylindrical cavity;

FIG. 17a is an enlarged sectional view designating a concrete example of disposing the diffusion preventive film between the viscous substance and the viscoelastic body, whereas

DESCRIPTION OF THE PREFERRED EMBODIMENTS

Referring now to FIGS. 1 through 21, the laminated rubber bearing according to a variety of embodiments of the invention will be described hereinbelow.

Figure 1A:
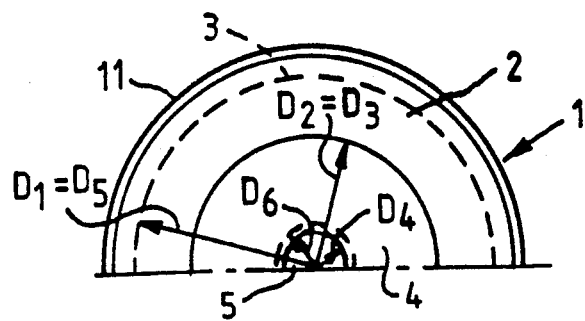
Figure 1B:
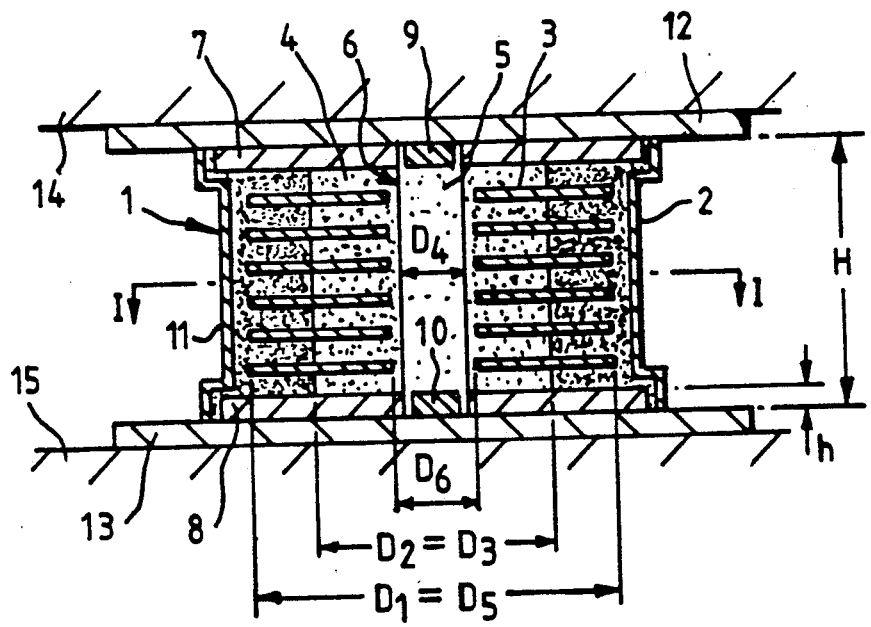

The laminated rubber bearing according to an embodiment of the invention shown in FIGS. 1a and 1b comprises a columnar viscoelastic body 5, a plurality of viscoelastic members 4 each having outer diameter D3 and inner diameter D4, and an external binding body 1 disposed in the periphery of the viscoelastic members 4. Structurally, the external binding body 1 is a laminated body in which a plurality of rigid plates 3 each having outer diameter D5 and inner diameter D6 and a plurality of rubber-like elastic plates 2 each having outer diameter D1 and inner diameter D2 are alternately laminated by disposing respective rubber-like elastic plates 2 between outer peripheral regions of respective rigid plates 3. A plurality of viscoelastic members 4 are disposed inside of the rubber-like elastic plates 2 of the external binding body 1 in order that interspace between the rigid plates 3 inside of respective rubber-like elastic plates 2 can be filled with the viscoelastic members 4. A cylindrical cavity 6 having inner diameter D4 is formed in the laminated domains of the viscoelastic members 4 and the rigid plates 3, where the cylindrical cavity 6 is open from the top to the ends thereof. The viscoelastic body 5 containing a volume greater than that of the cylindrical cavity 6 is forced into the cavity 6, thereby providing satisfactory mechanical coupling effect between the viscoelastic body 5 and the external binding body 1.

A pair of annular steel plates 7 and 8 for attachment are respectively secured to the top and bottom surfaces of the external binding body 1. The rigid plates 3, rubber-like elastic plates 2, and the top and bottom plates 7 and 8, are structurally integrated with each other by means of adhesive agent coated on junction surfaces during a vulcanizing process or a molding process. Another pair of steel plates 9 and 10 are secured to the top and bottom surfaces of the viscoelastic body 5. The reference numeral 11 shown in FIG. 1 designates an external covering rubber set to external circumferential surface of the external binding body 1.

The inner circumferential regions of those rigid plates 3 disposed between respective rubber-like elastic plates 2 of the external binding body 1 are embedded in the viscoelastic members 4 by way of extending themselves by a length corresponding to the result of subtraction of inner diameter D6 of each rigid plate 3 from outer diameter D3 of each viscoelastic member 4 in the structure of the laminated rubber bearing. Before being offered for practical service, based on the method to be described later on, the viscoelastic body 5 having a volume greater than that of the cylindrical cavity 6 is forced into the cylindrical cavity 6 formed in the viscoelastic members 4. When the laminated rubber bearing is put on actual service, the top and bottom steel plates 7 and 8 of the external binding body 1 are respectively secured to a pair of upper and lower fixing steel plates 12 and 13 with bolts so that the bearing having the cylindrical cavity 6 filled with the viscoelastic body 5 is then inserted between an upper structure 14 and a lower structure 15, and then the fixing steel plates 12 and 13 are respectively secured to the upper and lower structures 14 and 15 with bolts.

In order to restrain respective viscoelastic members 4 from swelling themselves in the external circumferential direction, all the rigid plates 3 making up the external binding body 1 are made of highly rigid members such as steel plates and all the rubber-like elastic plates 2 are made from highly damping rubber.

Not only columnar shape, but respective viscoelastic members 4 and the viscoelastic body 5 may also be of any optional plane shape like square columnar shape or the like. Available material includes all elastomers capable of exerting rubber-like viscoelasticity like natural rubber and derivatives, a variety of synthetic rubbers, rubber-like plastic, and the like. The viscoelastic members 4 and the viscoelastic body 5 may be composed of any of those materials identical to or different from each other.

Molecular structure of the viscoelastic members 4 and the viscoelastic body 5 may respectively be of bridged or non-bridged structure. Like those rubber-like elastic plates 2, the viscoelastic members 4 and the viscoelastic body 5 may be adhered to those rigid plates 3 and the upper and lower steel plates 7 and 8, or they may not be adhered to any of these. However, in order to minimize temperature-dependent characteristic of the viscoelastic members 4 and the viscoelastic body 5, generally, bridged molecular structure is preferred. Likewise, when those rigid plates 3 and the upper and lower steel plates 7 and 8 are adhered to the viscoelastic members 4 and the viscoelastic body 5, more stable shearing deformation is given to the viscoelastic material in such domains incurring extraordinary deformation, thus favorably promoting damping constant.

It is desired that the viscoelastic members 4 and the viscoelastic body 5 respectively contain such dynamic characteristic that can be expressed in terms of a minimum of 0.3 up to a maximum of 1.5 of loss coefficient tan $\delta$ and a minimum of 4 kgf/cm$^2$ up to a maximum of 20 kgf/cm$^2$ of the shearing elasticity modulus G while the shearing deformation is still underway. More preferably, such a laminated rubber bearing solely aiming to minimize acceleration transmissible to structures by the shock of earthquake shall contain a minimum of 0.5 up to a maximum of 1.3 of loss coefficient tan $\delta$ and a minimum of 6 kgf/cm$^2$ up to a maximum of 15 kgf/cm$^2$ of shearing elasticity modulus G.

It is desired that each of the rubber-like elastic plates 2 shall contain a minimum of 0.1 up to a maximum of 0.6 of loss coefficient tan $\delta$ and a minimum of 3 kgf/cm$^2$ up to a maximum of 15 kgf/cm$^2$ of shearing elasticity modulus while shearing deformation still goes on. More preferably, any of those laminated rubber bearings solely aiming to decrease acceleration transmissible to structures from the shock of earthquake shall contain a minimum of 0.2 up to a maximum of 0.5 of loss coefficient tan $\delta$ and a minimum of 5 kgf/cm$^2$ up to a maximum of 12 kgf/cm$^2$ of shearing elasticity modulus G.

Characteristically, each of the rubber-like elastic plates 2 has negligible compressive permanent strain. These rubber-like elastic plates 2 are respectively of soft-rubber plates each containing approximately 50 Hs of hardness.

If the viscoelastic members 4 and the viscoelastic body 5 respectively had less than 4 kgf/cm$^2$ of shearing elasticity modulus G, then, it will not fully improve damping performance of the laminated rubber bearing. Likewise, if the rubber-like elastic plates 2 respectively had less than 3 kgf/cm$^2$ of shearing elasticity modulus G, then, it will lower horizontal rigidity of the laminated rubber bearing. In this case, amount of deformation is magnified even when slight vibration occurs, and then, the deformation will exceed a critical amount predetermined for the laminated rubber bearing. Conversely, if the viscoelastic members 4 and the viscoelastic body 5 respectively had more than 20 kgf/cm² of shearing elasticity modulus G, and in addition, if the rubber-like elastic plates 2 had more than 15 kgf/cm² of shearing elasticity modulus G, then, it will strengthen horizontal rigidity of the laminated rubber bearing to expand proper frequency of the laminated rubber bearing itself. This in turn lowers practical effect to proof vibration and shock of earthquake.

If the viscoelastic members 4 and the viscoelastic body 5 respectively had less than 0.3 of loss coefficient tan δ, and yet, if the rubber-like elastic plates 2 respectively had less than 0.1 of loss coefficient tan δ, then, it will lower damping performance of these components to cause vibration absorptive capability to be lost when earthquake-proof function is actually needed for the laminated rubber bearing. Conversely, if the viscoelastic members 4 and the viscoelastic body 5 respectively had more than 1.5 of loss coefficient tan δ, and in addition, if the rubber-like elastic plates 2 respectively had more than 0.6 of loss coefficient tan δ, then, it will lower damping effect in frequency bands higher than the proper frequency of the laminated rubber bearing, thus easily leading to generation of vibration in high frequency bands.

In order to securely improve both the damping performance and the buckling-proof performance of the laminated rubber bearing, it is desired that the relationship between outer and inner diameters D5 and D6 of the rigid plates 3 and outer diameter D3 of the viscoelastic members 4 accommodated in the external binding body 1 shall fully satisfy the condition specified below:

$$0.9 \geq D3/D5 \geq 0.3$$

and $$0.8 \geq D6/D5 \geq 0.1$$

Concretely, when the relationship D3/D5<0.3 is present, share of the viscoelastic members 4 and the viscoelastic body 5 each containing high damping performance is decreased against the whole components of the laminated rubber bearing, thus lowering practical effect needed to improve damping performance. Likewise, when the relationship D3/D5>0.9 is present, width of each rubber-like elastic plate 2 is contracted, where the width corresponds to the result of subtraction of inner diameter D2 of each rubber-like elastic plate 2 from outer diameter D1 of each rubber-like elastic plate 2 followed by division of the subtracted result into two. In consequence, practical effect of binding each rubber-like elastic plate 2 against each viscoelastic member 4 and the viscoelastic body 5 is decreased, thus lowering buckling-proof performance.

When the relationship D6/D5<0.1 is present, outer diameter D4 of the viscoelastic body 5 is contracted to lower the effect yielded from insertion of the viscoelastic body 5 having volume greater than that of the cylindrical cavity 6, thus failing to achieve satisfactory mechanical coupling effect. On the other hand, when the relationship D6/D5>0.8 is present, outer diameter D4 of the viscoelastic body 5 expands to conversely contract width (concretely, (D5−D6)/2) of the external binding body 1. This in turn diminishes practical effect of binding each rubber-like elastic plate 2 against each viscoelastic member 4 and the viscoelastic body 5, thus lowering buckling-proof performance as well.

In the event that the laminated rubber bearing merely supports such a vertical load having insubstantial weight, the relationship between diameters of the rigid plates 3 and the viscoelastic members 4 may be in the range specified in the above description. However, when the vertical load increases, higher buckling-proof performance is required. To satisfy this, the following condition should preferably be established:

$$0.8 \geq D3/D5 \geq 0.3$$

$$0.7 \geq D6/D5 \geq 0.1$$

Figure 2:
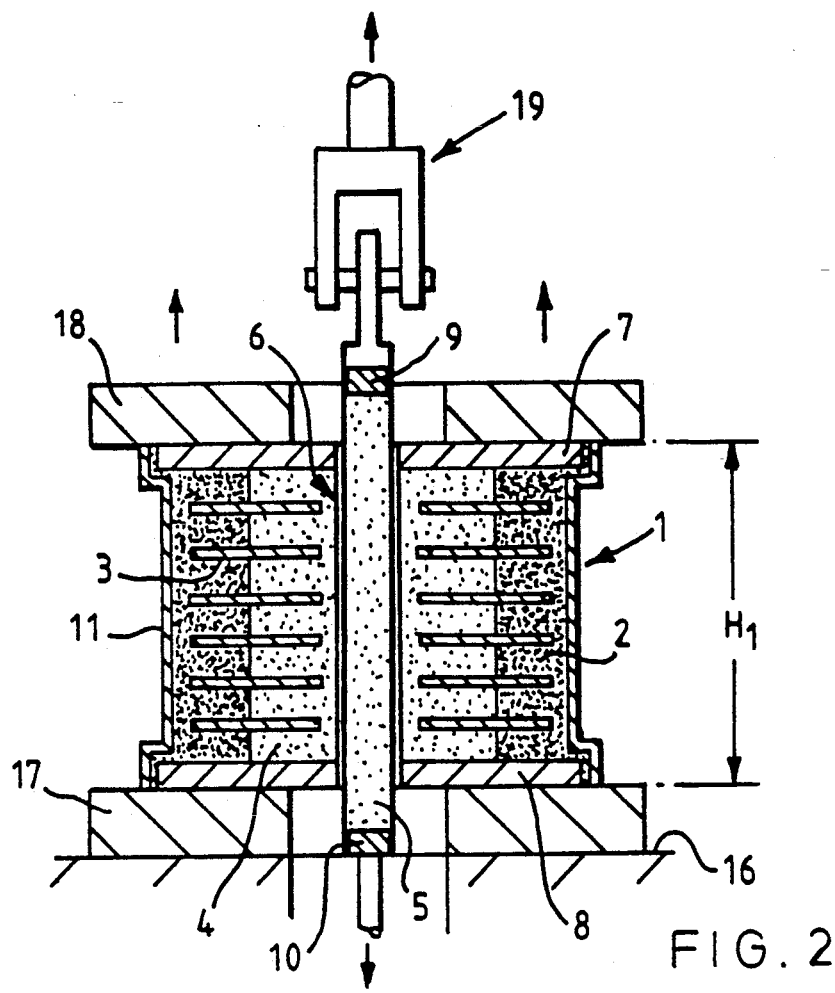
FIG. 2 is a sectional view designating a state in which a viscoelastic body of bridge structure under tensile condition is inserted in the cylindrical cavity in the external binding body under tensile condition according to the method of forcing the viscoelastic body into the cylindrical cavity.
Figure 3:
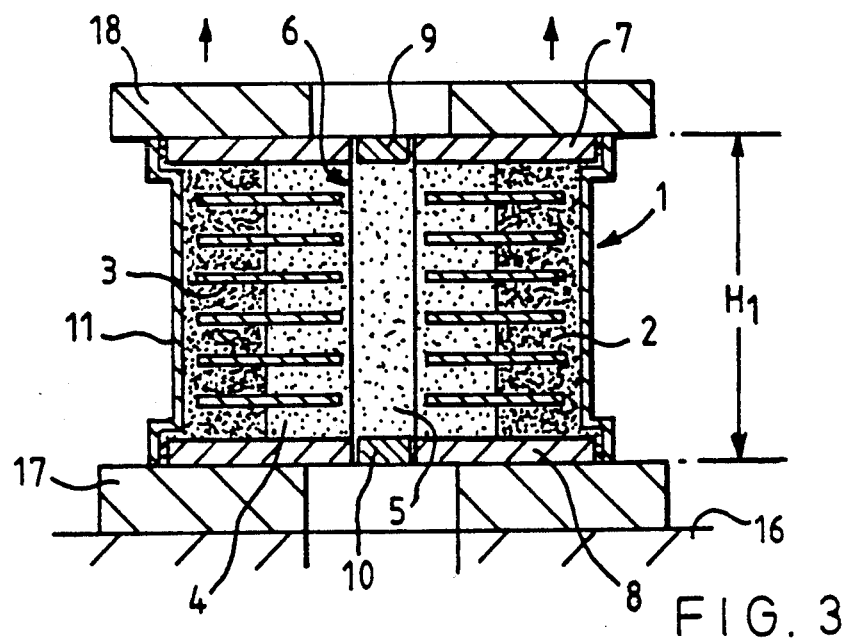
FIG. 3 is a sectional view designating the state subsequent to the release of the viscoelastic body shown in FIG. 2 from the tensile-force applied condition.
Figure 4:
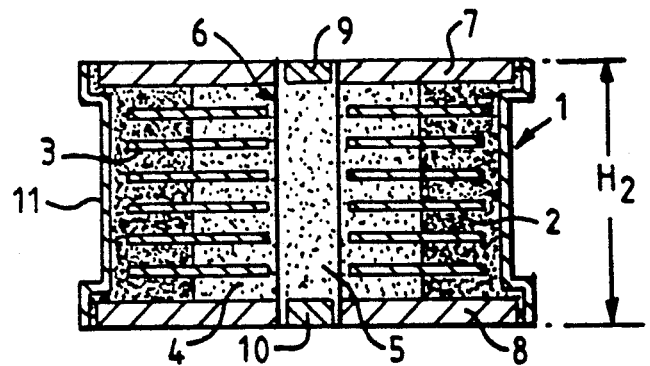

FIG. 1 schematically illustrates the laminated rubber bearing incorporating a bridged viscoelastic body 5 representing one of preferred embodiments of the invention. As shown in FIGS. 2 through 4, this laminated rubber bearing is manufactured in accordance with the procedure described below.

First, as shown in FIG. 2, an integrated body comprising an external binding body 1 incorporating the viscoelastic members 4 and other essential components is secured onto a stationary plate 16 via a fixing flange 17. Next, a jig (not shown) is engaged with a tractive flange 18 secured to the fixing flange 17 in order to exert tensile force in the upward direction until reaching height H1. When this condition is entered, the viscoelastic body 5 having volume greater than that of cylindrical cavity 6 is forced into this cylindrical cavity 6 by activating another jig 19 to pull the viscoelastic body 5 in the upward direction as of the state in which the outer diameter of the viscoelastic body 5 remains being narrower than the inner diameter of the cylindrical cavity 6. In the event that the viscoelastic body 5 can easily be inserted in the cylindrical cavity 6 without compulsorily exerting tensile force to lift the external binding body 1 up to the height H1, it is of course unnecessary to lift it up to the height H1.

Figure 11:
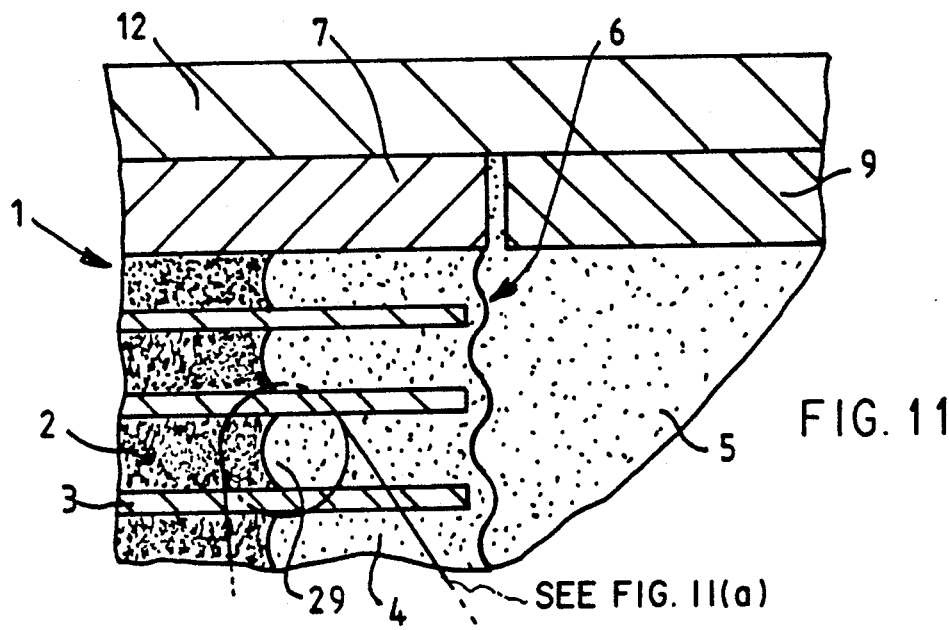
FIG. 11 is an enlarged sectional view of essential components of the laminated rubber bearing shown in FIG. 1b.
Figure 11A:
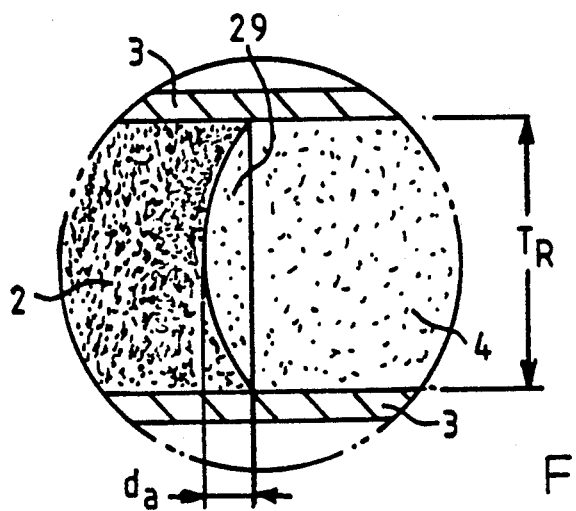

Next, tensile force exerted in the upward and downward directions to lift the viscoelastic body 5 is freed. Then, as shown in FIG. 3, the viscoelastic body 5 is closely inserted in the cylindrical cavity 6. Next, tensile force exerted in the upward direction against the external binding body 1 is freed. In consequence, as shown in FIG. 4, because of own stability of each rubber-like elastic plate 2, height H1 is decreased to height H2. As a result, the viscoelastic body 5 swells itself towards the viscoelastic members 4 to subsequently cause these viscoelastic members 4 to swell themselves towards respective rubber-like elastic plates 2. This in turn results in the generation of satisfactory mechanical coupling effect between the viscoelastic members 4 and the external binding body 1 as shown in FIG. 11. FIG. 1b illustrates practical condition of the laminated rubber bearing embodying the invention, in which weight of an upper structure is properly held by the laminated rubber bearing, where expansion of the viscoelastic body 5 and the viscoelastic members 4 towards the viscoelastic members 4 and the rubber-like elastic plates 2 is promoted furthermore, thus achieving more satisfactory mechanical coupling effect between the external binding body 1 and the viscoelastic members 4.

The above description has solely referred to the structure and the method of fabricating the embodiment in which the viscoelastic body 5 having bridged structure is forced into the cylindrical cavity 6. It should be understood however that the scope of the invention is not solely limited to the above-referred structure, but the invention may also provide such a laminated rubber bearing having the identical structure and based on the identical manufacturing method with the only exception in which an elastic body is substituted for the viscoelastic body 5.

Figure 5:
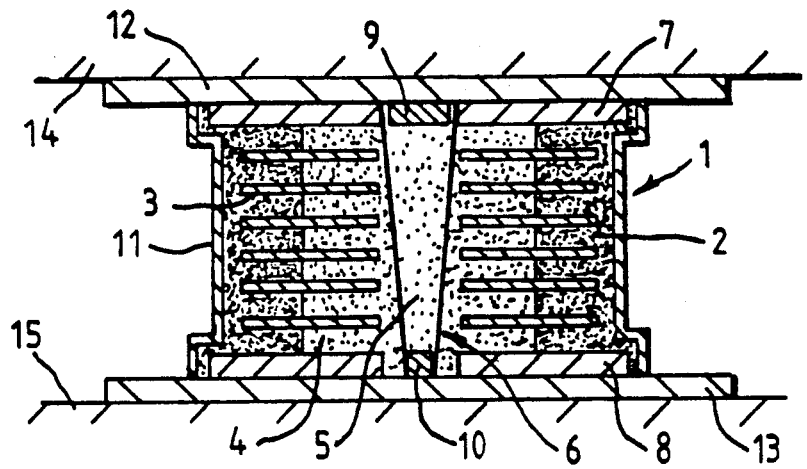
FIG. 5 is a sectional view designating the state after releasing the external binding body shown in FIG. 3 from the tensile-force applied condition.
Figure 6:
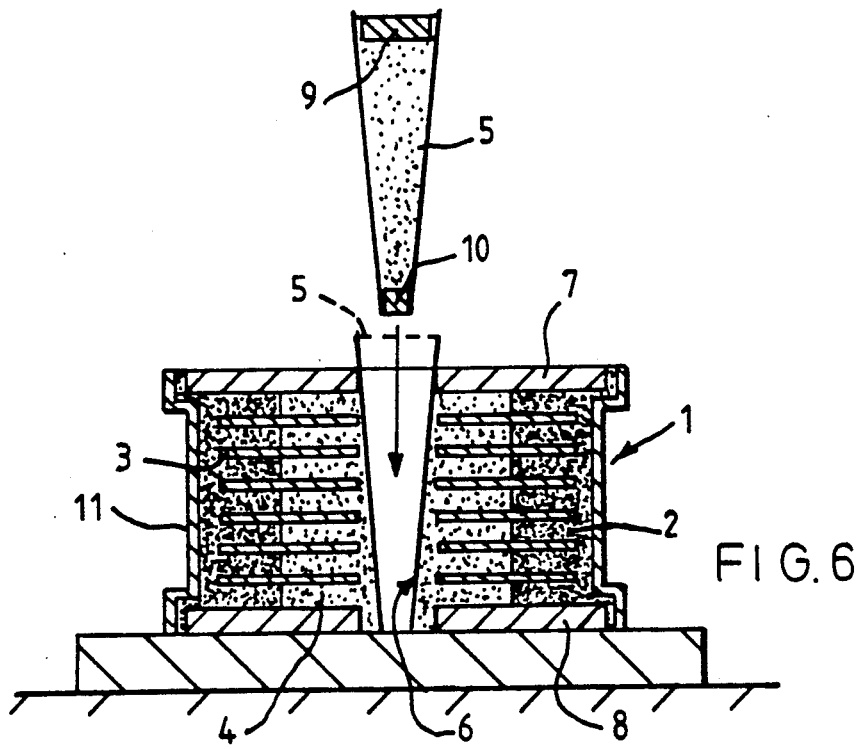
FIG. 6 is a sectional view designating the state prior to the insertion of the, viscoelastic body containing excessive cubage into the cylindrical cavity in the course of executing the method of forcing the viscoelastic body of non-bridge structure into the cylindrical cavity.

When using such a viscoelastic body 5 having non-bridged structure, as shown in FIG. 5, it is desired that surface of the cylindrical cavity 6 and surface of the viscoelastic body 5 in contact with each other be tapered so that outer diameter of the viscoelastic body 5 and inner diameter of the cylindrical cavity 6 gradationally taper towards the bottom end. By virtue of the formation of these tapered surfaces, even when the viscoelastic body 5 is not of bridged structure, as shown in FIG. 6, the viscoelastic body 5 containing excessive cubage can smoothly be forced into the cylindrical cavity 6 along the tapered surfaces of the viscoelastic body 5 and the cylindrical cavity 6. Since the insertion work thus be facilitated, manufacturing efficiency is promoted.

Instead of the viscoelastic body 5 and the elastic body described above, such a viscous substance shown in FIG. 7 may also advantageously be used as one of components to be forced into the cylindrical cavity 6. The viscous substance 20 may comprise those softeners prepared from mineral oil such as aromatic oil, naphthenic oil, or paraffin oil, or those softeners prepared from vegetable oil such as castor oil, cotton seed oil, rape seed oil, rosin, or paraffin oil, or those low-molecular oils such as silicone oil, polybutene, or polyisobutylene, etc. for example. Note that the reference numeral 21 shown in FIG. 7 designates a plug for closing an inlet port 22 formed in the upper steel plate 7 after injecting the viscous substance 20 into the cylindrical cavity 6 via the inlet port 22. Since other structural members like the external binding body 1, the viscoelastic members 4, and others, are of the structure identical to those which are described above, further description of these structural members is deleted here.

It is desired that the relationship between outer diameter D5 and inner diameter D6 of each rigid plate 3 and outer diameter D3 of each viscoelastic member 4 built in the external binding body 1 be in a range specified below:

$0.9 \geq D3/D5 \geq 0.1$ $0.8 \geq D6/D5$ $D6 \geq 10$ mm

When the condition $D3/D5 < 0.1$ is present, share of the high-damping viscoelastic members 4 against the whole components of the laminated rubber bearing is decreased to lower the effect of improving damping performance thereof. When the condition $D3/D5 > 0.9$ is present, width of the rubber-like elastic plates 2 is contracted to lower the effect of binding them against the viscoelastic members 4, thus lowering buckling-proof performance. Note that the width of each rubber-like elastic plates 2 corresponds to the result of substraction of inner diameter D2 of the rubber-like elastic plate 2 from outer diameter D1 of the same followed by division of the subtracted result into two.

When the condition $D6 < 10$ mm is present, inner diameter of the inlet port 22 used for injecting the viscous substance 20 into the cylindrical cavity 6 is contracted, thus making it difficult to inject the viscous substance 20 therethrough. Furthermore, the above condition also contracts outer diameter D4 of the viscous substance 20 to lower the effect contemplated by forcibly inserting the viscous substance 20 having a volume greater than that of the cylindrical cavity 6. In consequence, satisfactory mechanical coupling effect can be achieved. On the other hand, when the condition $D6/D5 > 0.8$ is present, outer diameter D4 of the viscous substance 20 expands to conversely contract width (D5−D6/2) of the external binding body 1. In consequence, the effect of binding against the viscoelastic members 4 is decreased, thus lowering buckling-proof performance as well.

In the event that the laminated rubber bearing merely supports such a vertical load having insubstantial weight, the relationship between the diameters may be in the range specified in the above description. However, when the vertical load increases, higher buckling-proof performance is required. To satisfy this, it is desired that the following condition be established:

$0.8 \geq D3/D5 \geq 0.3$ $0.7 \geq D6/D5 \geq 0.05$

When the cylindrical cavity 6 is filled with the viscous substance 20, as described earlier, inner diameter D6 of each rigid plate 3 may advantageously be less than that of the above case of filling the cylindrical cavity 6 with the viscoelastic body 5 (see FIG. 1b), thus enabling the laminated rubber bearing to simultaneously exert significantly higher damping and buckling-proof performances.

Figure 7:
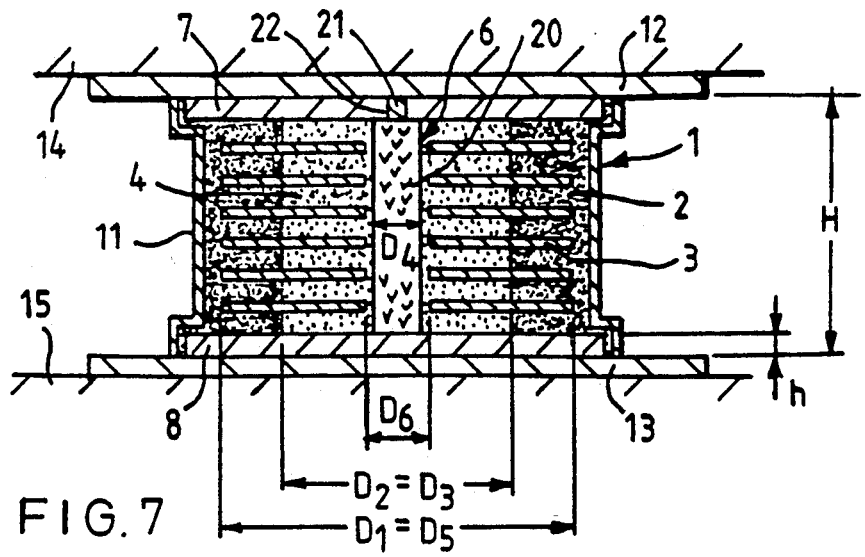
FIG. 7 is a sectional view designating the actual service condition of the laminated rubber bearing with viscous substance forced in the cylindrical cavity.
Figure 8:
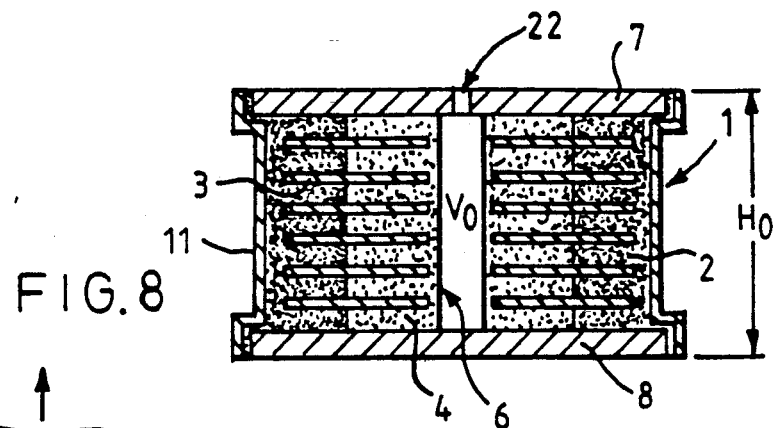
FIG. 8 is a sectional view designating the state prior to the insertion of the viscous substance into the cylindrical cavity in the course of executing the method of forcing the viscous substance into the cylindrical cavity.
Figure 9:
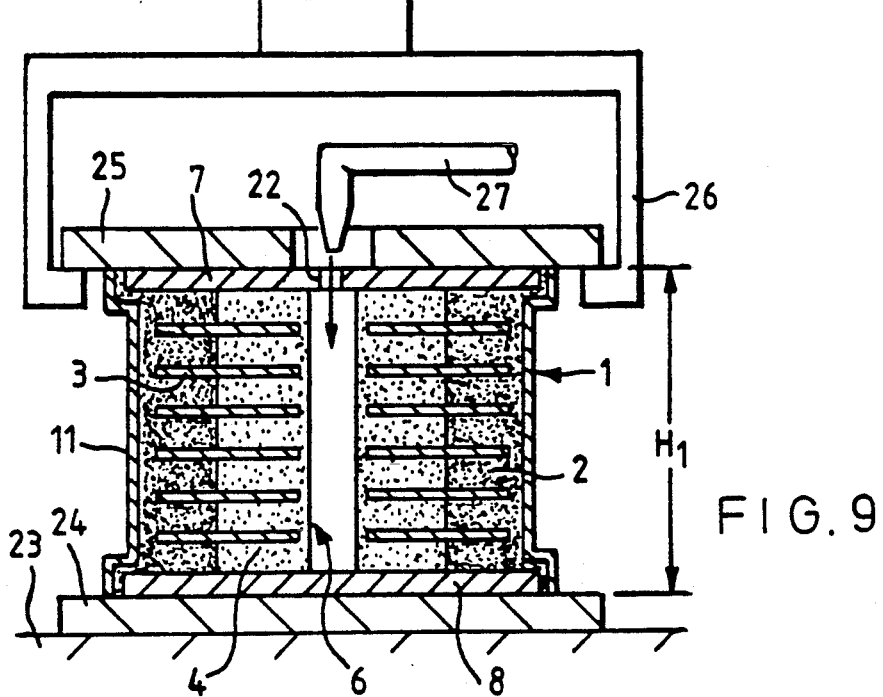
FIG. 9 is a sectional view designating the state of initiating injection of the viscous substance while holding the external binding body in tensile condition.
Figure 10:
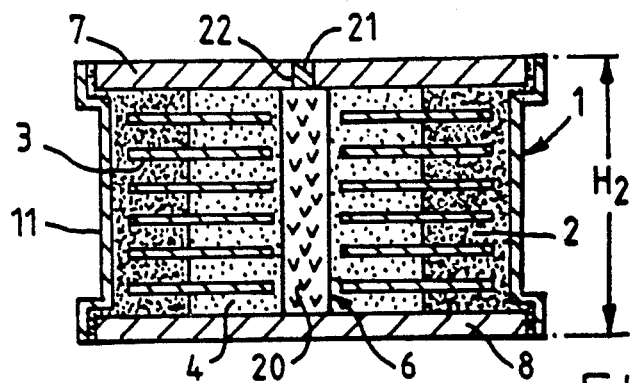
FIG. 10 is a sectional view designating the state in which the external binding body is released from tensile condition shown in FIG. 9 after plugging the cylindrical cavity filled with the viscous substance.

As shown in FIGS. 8 through 10, the laminated rubber bearing using the viscous substance 20 according to the embodiment shown in FIG. 7 is manufactured based on the method described below.

First, as shown in. FIG. 8, those essential components including the external binding body 1, the viscoelastic members 4, and others, are integrated into a single, unit. The integrated unit has height H0 and incorporates the cylindrical cavity 6 of volume V0. As shown in FIG. 9, the integrated unit is secured onto a stationary plate 23 via a connecting plate 24. After engaging a jig 26 with a tractive flange 25 secured to the top-surface steel plate 7 of the laminated rubber bearing, tensile force is exerted in the upward direction from height H0 to H1. In consequence, volume of the cylindrical cavity 6 expands from V0 to V1. While this condition remains, the prepared viscous substance 20 is injected into the cylindrical cavity 6 containing expanded volume by means of an injection nozzle 27.

Next, an inlet port 22 is closed by means of a plug 21, and then, the tractive force acting upon the external binding body 1 in the upward direction is freed. In consequence, as shown in FIG. 10, because of own stability of each rubber-like elastic plate 2, height of the external binding body 1 becomes H2(H1>H2>H0) to prove that the viscous substance 20 having a volume greater than that of the cylindrical cavity 6 is fully accommodated in the cylindrical cavity 6. As a result, the effect of expansion of the viscous substance 20 towards the viscoelastic members 4 causes these viscoelastic members 4 to swell themselves towards the rubber-like elastic plates 2, thus achieving satisfactory mechanical coupling effect between the viscoelastic members 4 and the external binding body 1. According to the practical condition of use shown in FIG. 7, since the laminated rubber bearing is loaded with actual weight of the upper structure mounted thereon, the effect of expansion of the viscous substance 20 towards the viscoelastic members 4 and subsequent expansion of the viscoelastic members 4 towards the rubber-like elastic plates 2 is magnified furthermore, thus achieving more satisfactory mechanical coupling effect between the viscoelastic members 4 and the external binding body 1.

It is desired that such highly viscous substance 20 containing satisfactory damping performance characteristic be introduced. A special feeding device is needed in order to prevent unwanted foam from intermingling in the viscous substance 20 on the way of injecting the viscous substance 20 into the cylindrical cavity 6. Therefore, from the practical viewpoint, use of such a viscous substance 20 having 100 through 10000 cSt is preferred in that any foam can readily be released under atmospheric pressure.

FIG. 11 is an enlarged sectional view of fundamental components of the laminated rubber bearing shown in FIG. 1b incorporating the bridged viscoelastic body 5 and being offered for actual service. This sectional view illustrates satisfactory mechanical coupling condition between the external binding body 1 and the viscoelastic body 5 containing excessive cubage after being inserted in the cylindrical cavity 6. FIG. 11 illustrates the state in which free surface of the viscoelastic body 5 is withheld by inner circumferential surface of the cylindrical cavity 6, thus causing the viscoelastic body 5 to swell itself towards the external binding body 1. The effect of expansion as at 28 of the viscoelastic body 5 towards the viscoelastic members 4 causes all the viscoelastic members 4 to subsequently swell themselves towards the rubber-like elastic members 2. The effect of expansion (designated by the reference numerals 28 and 29 in FIG. 11) generated by the viscoelastic members 4 and the viscoelastic body 5 fully prevents unwanted clearance from being generated between the viscoelastic members 4 and the viscoelastic body 5, thus achieving quite satisfactory effect of mechanical coupling with the external binding body 1.

Assume that excessive cubage (per layer of the rubber-like elastic plates 2) generated by expansion 29 of the viscoelastic members 4 is designated to be "Va", total cubage of the viscoelastic body 5 to be "Vb", total cubage of the cylindrical cavity 6 to be "Vc", and the number of the layer of the rubber-like elastic plates 2 to be "n", and then based on these, a relationship "Vb=(Va×n)+Vc" can be established. When the thickness of each layer is designated in terms of TR, as shown in an enlarged scale in FIG. 11, length "da" of the expansion 29 generated by the viscoelastic members 4 corresponds to 5 through 60% of the thickness TR of each layer of the rubber-like elastic plates 2. This relationship is expressed by way of "da=(0.05 through 0.6)×TR". The laminated rubber bearing of the invention uses the viscoelastic body 5 containing cubage (Va×n) determined by multiplying the length "da" into inner surface area of each rubber-like elastic plate 2, where the cubage (Va×n) is in excess of actual cubage Vc of the cylindrical cavity 6.

As described above, inner circumferential domains of the rigid plates 3 built in the laminated rubber bearing are fully accommodated in the adjoining viscoelastic members 4, and therefore, inner diameters of these rigid plates 3 are integrally contracted to result in the improved buckling-proof performance. In particular, when introducing the viscous substance 20, inner diameters of these rigid plates 3 are contracted furthermore, thus sharply promoting buckling-proof performance. Since the viscoelastic members 4 are disposed between inner peripheral regions of the rigid plates 3, shearing deformation of these viscoelastic members 4 is dominant. This in turn securely promotes energy-absorptive capability resulted from frictional attenuation. Furthermore, since the viscoelastic body 5 having a volume greater than that of the cylindrical cavity 6 is forcibly inserted in the cylindrical cavity 6, no clearance is generated between the viscoelastic members 4 and the viscoelastic body 5. In consequence, quite satisfactory mechanical coupling effect is achieved, thus promoting the energy-absorptive capability and damping performance furthermore.

Figure 12A:
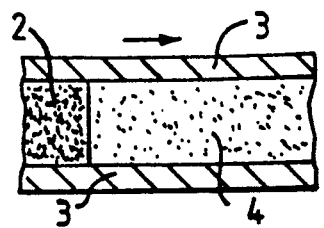
FIGS. 12a–d are respectively enlarged sectional views designating transferring condition of the rubber-like elastic plates caused by own thermal expansion while vulcanizing molded objects on the way of manufacturing the laminated rubber bearing.
Figure 12B:
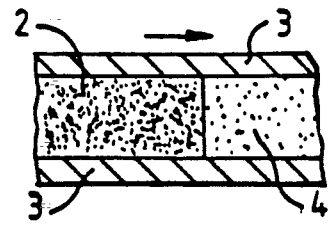
Figure 12C:
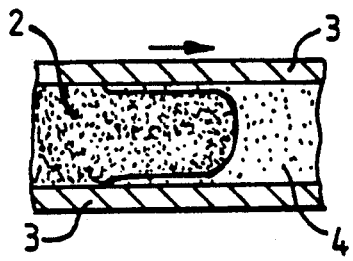
Figure 12D:
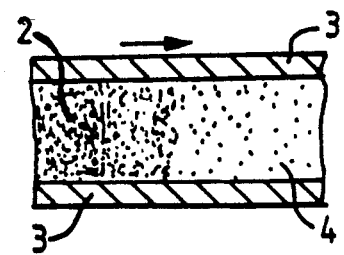

While vulcanizing molded pieces in the course of manufacturing the laminated rubber bearing, because of the effect of mixture of the rubber-like elastic plates 2 with the viscoelastic members 4, adhesion between the rubber-like elastic plates 2 and the rigid plates 3 may be degraded. Concretely, as shown in FIG. 12a, on the way of executing a vulcanizing process, because of thermal expansion, the rubber-like elastic plates 2 shift themselves in the arrowed direction. FIG. 12a designates a case in which a molded piece is thermally treated from outer peripheral lateral side. FIG. 12b illustrates an ideal state in which a rubber-like plate 2 evenly proceeds itself. Nevertheless, in an actual case shown in FIG. 12c for example, part of a viscoelastic member 4 may remain between the adjoining rubber-like elastic plate 2 and the rigid plate 3, or as shown in FIG. 12d, rubber composed of a mixture of the rubber-like elastic plate 2 and the viscoelastic member 4 may remain in contact with the rigid plate 3. Once this condition is generated, the rubber-like elastic plates 2 cannot properly come into contact with the rigid plates 3 which are complete with optimal surface treatment to be compatible with the rubber-like elastic plates 2. As a result, adhesion between those rubber-like elastic plates 2 and those rigid plates 3 is lowered.

Figure 13:
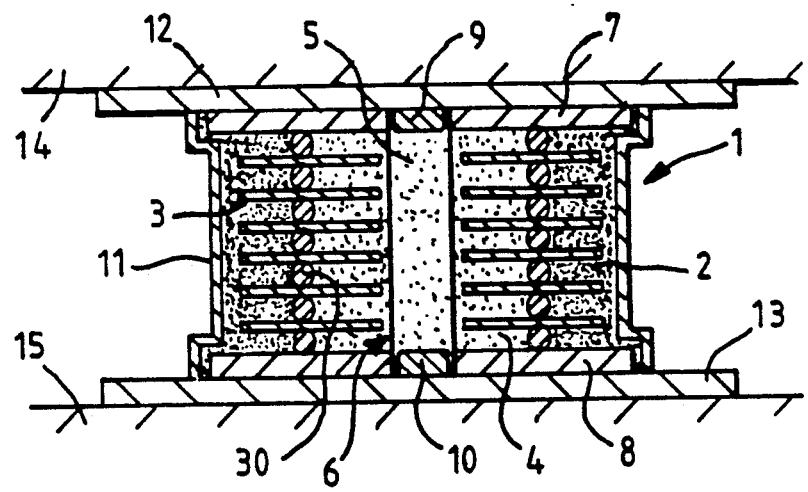
FIG. 13 is a sectional view designating an example of using a means for preventing the rubber-like elastic plates from unnecessarily shifting themselves because of own thermal expansion in the laminated rubber bearing shown in FIG. 1b.

To prevent those faulty symptoms mentioned above from occurrence, it is desired that the structure shown in FIG. 13 be materialized. Concretely, as shown in FIG. 13, a sealing member 30 such as an O-ring for example is disposed between the viscoelastic members 4 and the rubber-like elastic plates 2 to permit the sealing member 30 to function to prevent each rubber-like elastic plate 2 and each viscoelastic member 4 from intermingling with each other and also prevent adhesion between each rubber-like elastic plate 2 and each rigid plate 3 from being lowered.

Figure 14A:
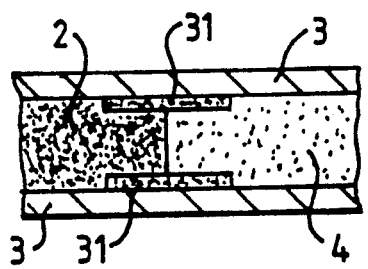
FIGS. 14a and 14b are respectively enlarged sectional views designating transferring condition of the rubber-like elastic plates as another example of using a means for preventing the rubber-like elastic plates from unnecessarily shifting themselves because of own thermal expansion.
Figure 14B:
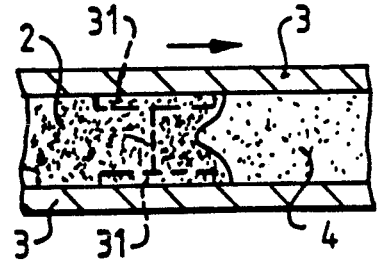
Figure 15A:
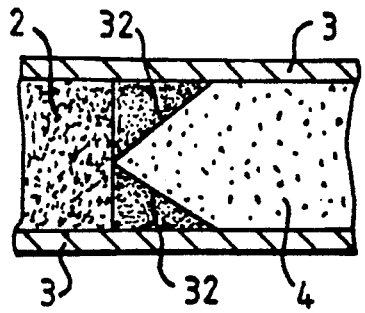
FIGS. 15a and 15b are respectively enlarged sectional views designating transferring condition of the rubber-like elastic plates as another example of using a means for preventing the rubber-like elastic plates from unnecessarily shifting themselves because of own thermal expansion.
Figure 15B:
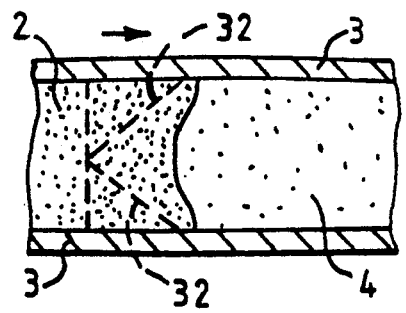

As another practical means, as shown in FIG. 14a, a pair of thin strip rubbers 31 having the composition identical to that of the rubber-like elastic plate 2 are disposed so that these strip rubbers 31 can respectively be brought into contact with the rubber-like elastic plates 2 and the viscoelastic plates 4. In consequence, as shown in FIG. 14b, even when those rubber-like elastic plates 2 shift themselves on the way of executing a vulcanizing process, those parts of the rubber-like elastic plates 2 intermingling with the viscoelastic members 4 are prevented from being brought into contact with the rigid plates 3, and therefore, adhesion between those rubber-like elastic plates 2 and those rigid plates 3 remains constant without incurring degradation at all. Furthermore, as another practical means, as shown in FIG. 15a, a rubber member 32 having triangular section and composition identical to that of the rubber-like elastic plates 2 is disposed between each rubber-like elastic plate 2 and each viscoelastic member 4 being nipped by the rubber members 32. By virtue of the provision of this structure, as shown in FIG. 15b, even when the rubber-like elastic plates 2 shift themselves on the way of executing a vulcanizing process, the internal structure turns to the state shown in FIG. 15b, and as a result, adhesion between each rubber-like elastic plate 2 and each rigid plate 3 remains constant without incurring degradation at all.

The content of the above description is also applicable to the structure of the laminated rubber bearing using the viscoelastic body 5 without having the structure shown in FIG. 5 and the other laminated rubber bearing using the viscous substance 20 shown in FIG. 7, and therefore, duplicated description is deleted here.

Figure 16:
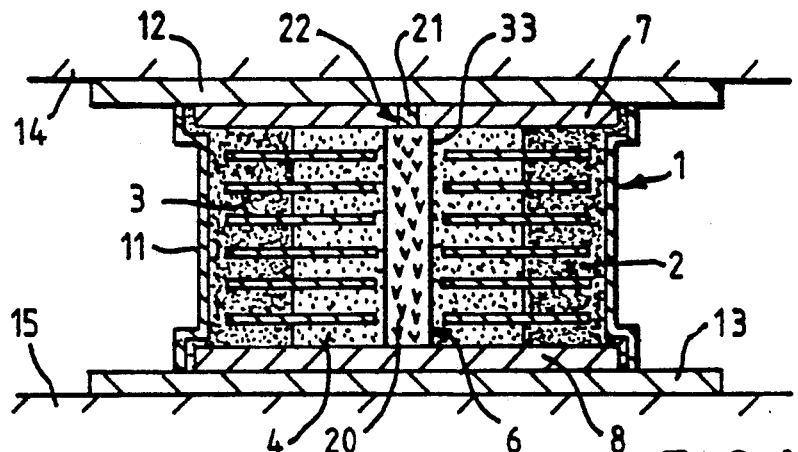
FIG. 16 is a sectional view of the laminated rubber bearing containing a diffusion preventive film disposed between the viscous substance and the viscoelastic body shown in FIG. 7.

On the other hand, when the viscoelastic members 4 devoid of the bridged structure are built in the laminated rubber bearing using the viscous substance 20 shown in FIG. 7, since the laminated rubber bearing consistently serves for a long period of time under substantial vertical load loaded thereon, due to possible diffusion between the viscous substance 20 and the viscoelastic members 4, degradation of these viscoelastic members 4 may take place to eventually result in the degraded performance characteristic. To prevent this, as shown in FIG. 16, a diffusion preventive film 33 is provided between the viscous substance 20 and the viscoelastic members 4.

Figure 17A:
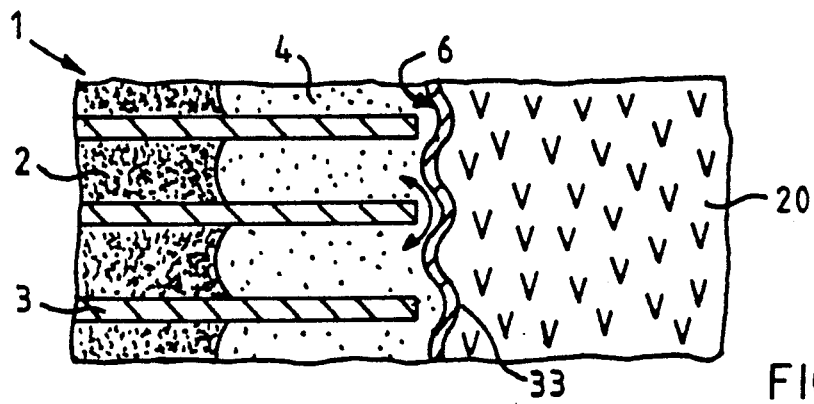
Figure 17B:
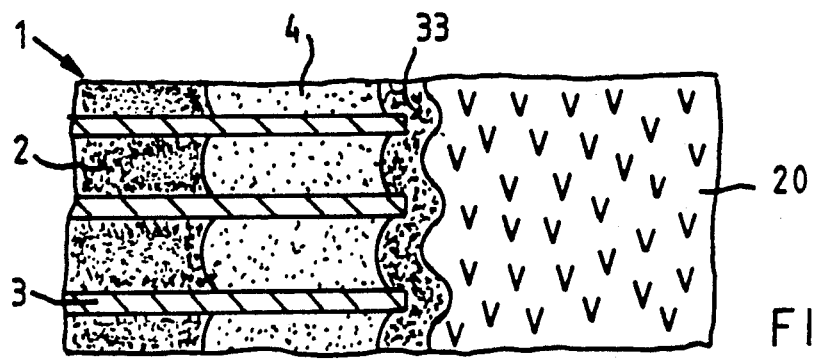
FIG. 17b is an enlarged sectional view designating another concrete example thereof.

A variety of materials may be used for the diffusion preventive film 33. For example, available materials include the following; polyurethane rubber or silicone rubber capable of hardening itself at room temperature, vulcanized rubber, film, or the like. The diffusion preventive film 33 can be formed by applying any of those methods described below. Prior to the injection of the viscous substance 20 as previously described in reference to FIG. 9, a thin film of either the above-cited room-temperature-setting polyurethane rubber, silicone rubber or the like is formed on the inner circumferential surface of the cylindrical cavity 6 as shown in FIG. 17a. As another practical method, simultaneous with execution of a vulcanizing process for integrating the rubber-like elastic plates 2 with those rigid plates 3 inside of the external binding body 1, vulcanized rubber is thinly coated in the form of film on the inner surface of the cylindrical cavity 6 for integration therein. As a still further practical method, a tubular film filled with the viscous substance 20 may be inserted in the cylindrical cavity 6. When using vulcanized rubber, as shown in FIG. 17b, the diffusion preventive film 33 composed of vulcanized rubber may integrally be adhered to the cylindrical cavity 6 in conjunction with the rigid plates 3. By virtue of the provision of the diffusion preventive film 33 the viscoelastic members 4 can also be prevented from flowing in the arrowed direction as shown in FIG. 17a.

Figure 18:
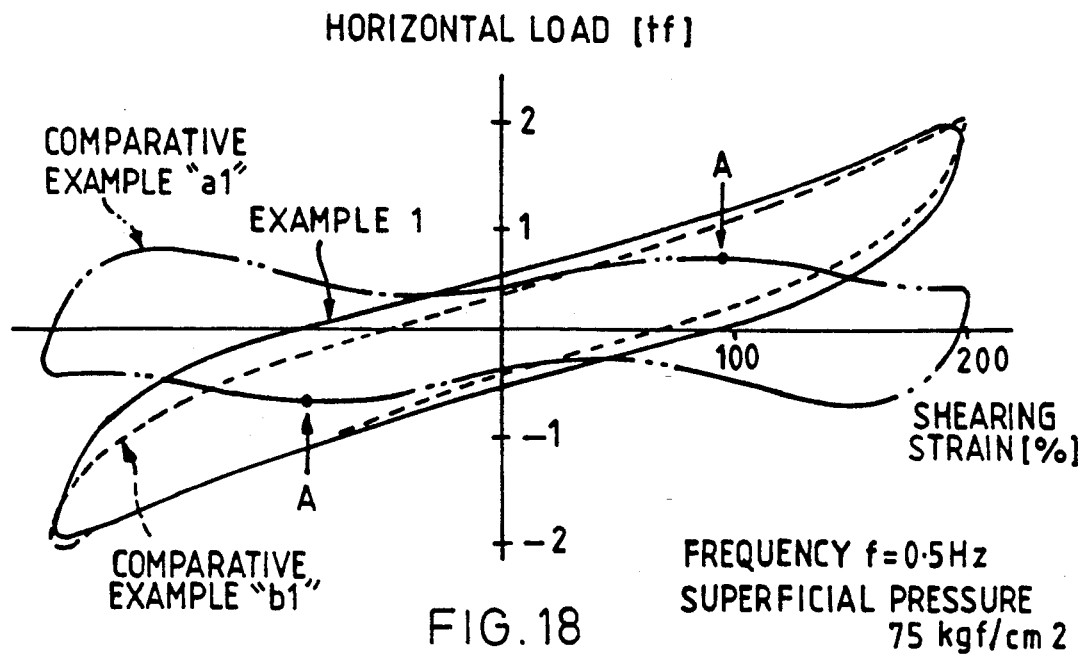
FIG. 18 is an analytical chart designating horizontal stability characteristic checked in the course of dynamic horizontal shearing tests executed by the inventors during the first comparative test.
Figure 19:
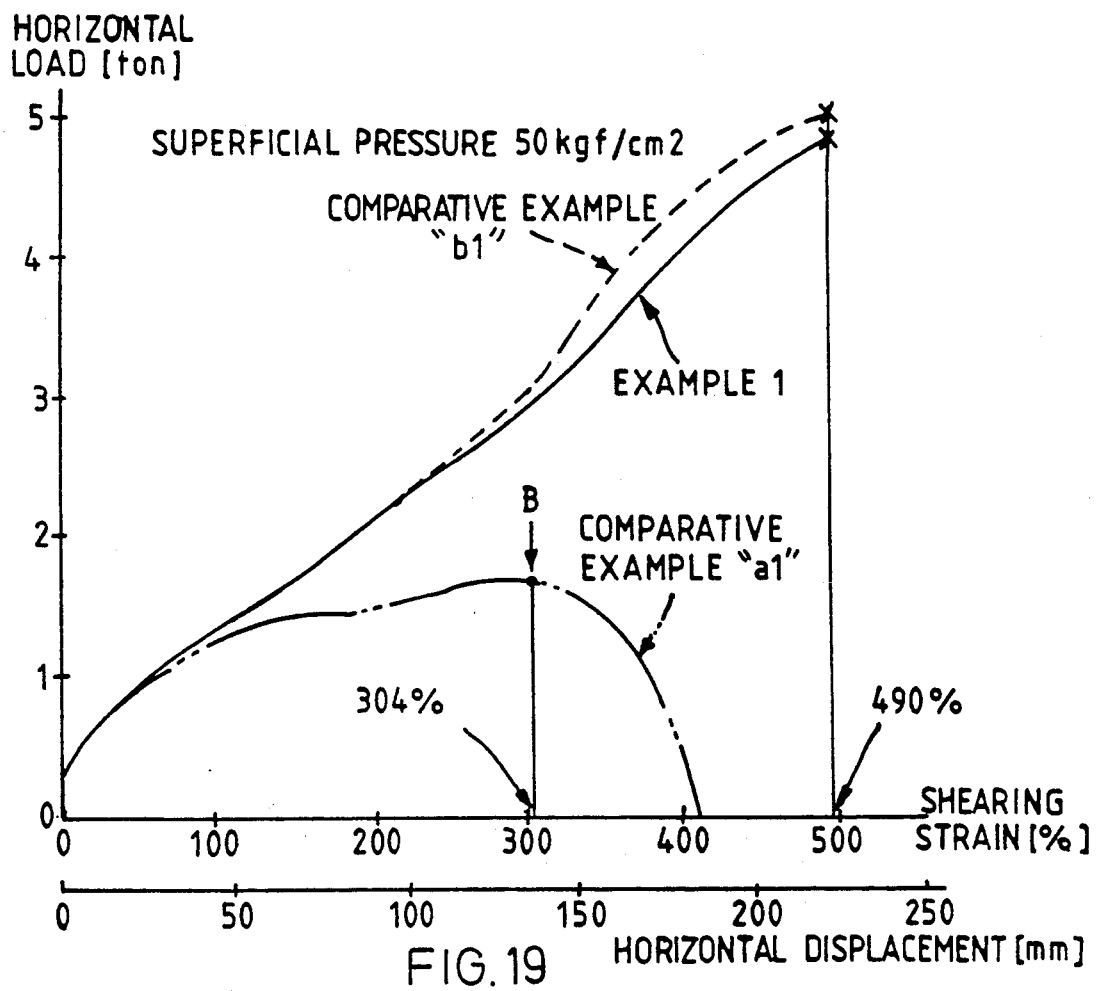
FIG. 19 is a graphical chart designating results of shear fracture tests executed by the inventors during the first comparative test.
Figure 20:
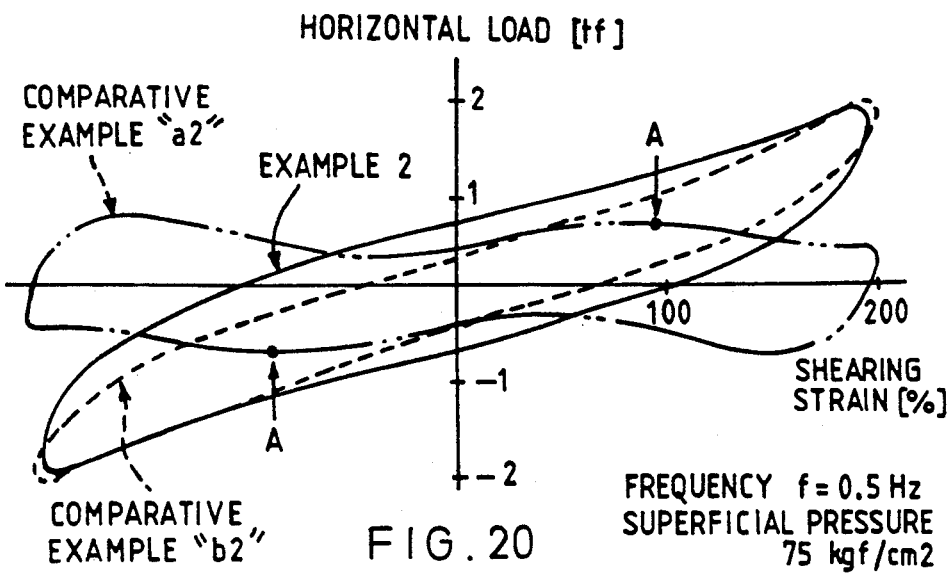
FIG. 20 is an analytical chart designating horizontal stability characteristic checked in the course of dynamic horizontal shearing tests executed by the inventors during the second comparative test.
Figure 21:
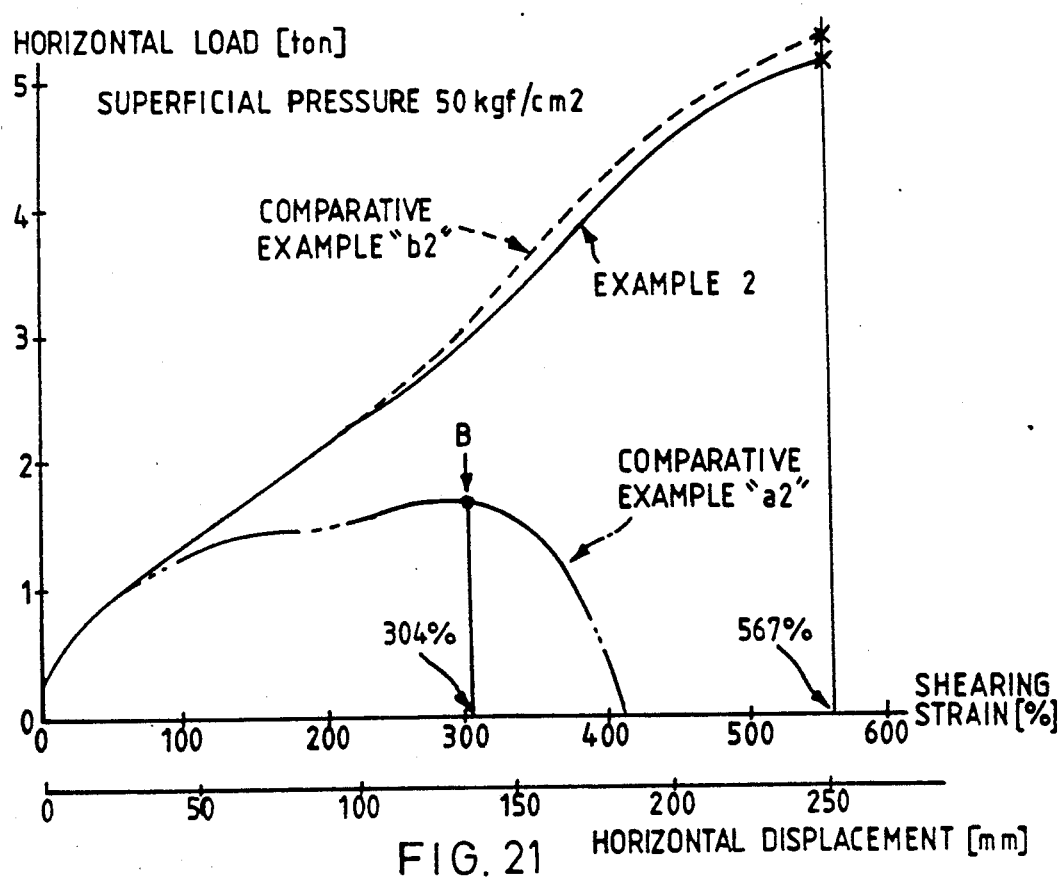
FIG. 21 is a graphical chart designating results of shear fracture tests executed by the inventors during the second comparative test.

Referring now to FIGS. 18 through 24, concrete details of comparative tests between the laminated rubber bearing according to the invention and conventional laminated rubber bearings executed by the inventors will be described hereinbelow. FIGS. 18 and 20 respectively designate horizontal righting characteristic measured via dynamic horizontal shearing tests executed at 0.5 Hz of frequency and at a maximum of $\gamma = \pm 200\%$ of shearing strain. FIGS. 19 and 21 respectively designate results of shear fracture tests. In the first comparative test shown in FIGS. 18 and 19, the laminated rubber bearing with the viscoelastic body 5 forcedly inserted in the cylindrical cavity 6 was used as Example 1. In the second comparative test, the laminated rubber bearing with the viscous substance 20 forcedly inserted in the cylindrical cavity 6 was used as Example 2.

Details of the structure, dimension, and physical characteristics of component materials of Examples 1 and 2 and comparative Examples "a1", "b1", "a2", and "b2", which are respectively disclosed in the Japanese Laid-Open Patent Publication No. 3-163231, are as follows:

The First Comparative Test

Example 1

Structural and Dimensional Details

Rigid plates: Steel (SPCC) 1 mm ×24 layers
Outer diameter of individual rigid plate: $D5 = 18$ cm
Inner diameter of individual rigid plate: $D6 = 3.6$ cm
Rubber-like elastic plates: Rubber 1.8 mm ×25 layers
Inner diameter of each rubber-like elastic plate: $D2 = 9.4$ cm
Outer diameter of each viscoelastic member: $D3 = 9.4$ cm
Outer diameter of the viscoelastic body: $D4 = 3.0$ cm
Excessive rate of cubage of the viscoelastic body: 40%
$H = 10.7$ cm $h = 1.9$ cm (See FIG. 1b)
Secondary shape factor: 4

Physical Characteristic of Component Material

Rubber-like elastic plate:
Shearing elasticity modulus: 6.8 kgf/cm$^2$
tan $\delta$: 0.3 Hardness (HS): 55
Viscoelastic member/Viscoelastic body:
Shearing elasticity modulus: 6.5 kgf/cm$^2$
tan $\delta$: 1.0

Comparative Example "a1"

Structural and Dimensional Details

Rigid plates: Steel (SPCC) 1 mm ×24 layers
Outer diameter of individual rigid plate: $D5 = 18$ cm
Inner diameter of individual rigid plate: $D6 = 10.2$ cm
Rubber-like elastic plates: Rubber 1.8 mm ×25 layers
Inner diameter of each rubber-like elastic plate: $D2 = 10.2$ cm
Outer diameter of the viscoelastic body: $D4 = 9.4$ cm
Excessive rate of cubage of the viscoelastic body: 40%
$H = 10.7$ cm $h = 1.9$ cm
Secondary shape factor: 4

Physical Characteristic of Component Material

Identical to those of component materials of Example 1.

Comparative Example "b1"

Structural and Dimensional Details

Rigid plates: Steel (SPCC) 1 mm ×24 layers

Outer diameter of individual rigid plate: D5=18 cm
Inner diameter of individual rigid plate: D6=3.6 cm
Rubber-like elastic plates: Rubber 1.8 mm ×25 layers
Inner diameter of each rubber-like elastic plate: D2=3.6 cm
Outer diameter of the viscoelastic body: D4=3.0 cm
Excessive rate of cubage of the viscoelastic body: 40%
H=10.7 cm  h=1.9 cm
Secondary shape factor: 4

Physical Characteristic of Component Material

Identical to those of component materials of Example 1.

The Second Comparative Test

Example 2

Structural and Dimensional Details

Rigid plates: Steel (SPCC) 1 mm ×24 layers
Outer diameter of individual rigid plate: D5=18 cm
Inner diameter of individual rigid plate: D6=1.6 cm
Rubber-like elastic plates: Rubber 1.8 mm ×25 layers
Inner diameter of each rubber plate: D2=9.4 cm
Outer diameter of each viscoelastic member: D3=9.4 cm
Inner diameter of each viscoelastic member: D4=1.6 cm
Outer diameter of the viscous substance: D4=1.5 cm
Excessive rate of cubage of the viscous substance: 40%
H=10.7 cm  h=1.9 cm (See FIG. 7)
Secondary shape factor: 4

Physical Characteristic of Component Material

Rubber-like elastic plates:
Shearing elasticity modulus: 6.8 kgf/cm$^2$
tan δ: 0.3
Hardness (HS): 55
Viscoelastic members:
Shearing elasticity modulus: 6.5 kgf/cm$^2$
tan δ: 1.0
Viscous substance:
Viscosity: 3500 cSt Comparative Example "a2"

Structural and Dimensional Details

Rigid plates: Steel (SPCC) 1 mm ×24 layers
Outer diameter of individual rigid plate: D5=18 cm
Inner diameter of individual rigid plate: D6=10.2 cm
Rubber-like elastic plates: Rubber 1.8 mm ×25 layers
Inner diameter of each rubber-like elastic plate: D2=10.2 cm
Outer diameter of the viscoelastic substance: D4=9.4 cm
Excessive rate of cubage of the viscoelastic substance: 40%
H=10.7 cm  h=1.9 cm
Secondary shape factor: 4

Physical Characteristic of Component Material

Identical to those of component materials of Example 2.

Comparative Example "b2"

Structural and Dimensional Details

Rigid plates: Steel (SPCC) 1 mm ×24 layers
Outer diameter of individual rigid plate: D5=18 cm
Inner diameter of individual rigid plate: D6=1.6 cm
Rubber-like elastic plates: Rubber 1.8 mm ×25 layers
Inner diameter of each rubber-like elastic plate: D2=1.6 cm
H=10.7 cm  h=1.9 cm
Secondary shape factor: 4

Physical Characteristic of Component Material

Identical to those of component material of Example 2.

As described above, those comparative examples "a1" and "a2" used for executing the first and second comparative tests were respectively of a peripheral-binding type laminated rubber bearing incorporating a cylindrical cavity filled with viscoelastic substance having outer diameter D4 being identical to outer diameter D3 of the viscous substance built in Examples 1 and 2. Likewise, the comparative example "b1" used for executing the first comparative test was a peripheral-binding type laminated rubber bearing incorporating rigid plates each having inner diameter D6 being identical to that of Example 1. On the other hand, the comparative example "b2" used for executing the second comparative test was a conventional high-damping laminated rubber bearing incorporating a plurality of rigid plates each having inner diameter D6 being identical to that of Example 2. The comparative example "b2" was devoid of viscous substance in the cylindrical cavity.

Those horizontal stability characteristic shown in FIGS. 18 and 20 were respectively rated while executing dynamic horizontal shearing tests on the way of comparative tests between Example 1 and those comparative examples "a1" and "b1" and also on the way of comparative tests between Example 2 and those comparative examples "a2" and "b2". Concretely, Examples 1 and 2 respectively exhibited 25% and 30% of equivalent damping constant at 0.5 Hz of frequency and at γ=50% of shearing strain, and yet, these proved to be free of shearing strain at buckling point A. On the other hand, those comparative examples "a1" and "a2" respectively exhibited 21% of equivalent damping constant. However, these comparative examples "a1" and "a2" respectively incurred 94% of shearing strain at the buckling point A. Conversely, those comparative examples "b1" and "b2" did not incur shearing strain at the buckling point A. However, these comparative examples "b1" and "b2" proved to be significantly poor in the equivalent damping constant which was rated to be 17% and 16%.

As shown in FIGS. 19 and 21, as a result of executing shear fracture tests against Examples 1 and 2, fracture occurred at 490% and 567% of shearing strain, respectively. On the other hand, it was confirmed that those comparative examples "a1" and "a2" respectively incurred buckling at 304% of shearing strain (shown at point B in FIGS. 19 and 20). It was also confirmed that those comparative examples "b1" and "b2" were respectively broken off at 490% and 567% of shearing strain.

These values 490% and 567% of the shearing strain exhibited by Examples 1 and 2 were respectively converted into horizontal displacement values which were rated to be 220.5 mm and 255.15 mm being greater than diameters of respective rigid plates. While executing those comparative tests, since each rigid plate had 180 mm of diameter, when the horizontal displacement value exceeded 180 mm, vertical-directional superposition of those rigid plates 3 was lost, and thus, presumably, it resulted in the sharply decreased capability to sustain vertical load, and in, consequence, the laminated rubber bearings were buckled.

In consideration of the results of the above comparative tests, if the laminated rubber bearing had flat shape having substantial secondary shape factor corresponding to a ratio of outer diameter of each rigid plate 3 to total thickness of the rubber-like elastic plates 2, for example, if each rigid plate 3 had 303 mm of outer diameter D5 and each rubber-like elastic plate 2 had 1.8 mm of thickness, and yet, if the secondary shape factor were 6.7, there is vertical-directional superposition of the rigid plates 3 up to the neighborhood of shear fracture strain of the rubber-like elastic plates 2, and therefore, it is possible that shear fracture strain of such a laminated rubber bearing can generate a certain value greater than that was generated in the above comparative tests.

In consideration of the results of the above comparative tests thus far described, it is apparent that the laminated rubber bearing according to the invention can provide extremely satisfactory damping performance and buckling-proof performance during service.

As is apparent from the results of performance tests executed by the inventors, the invention provides such a reliable laminated rubber bearing capable of exhibiting substantial practical value and surpassing damping and buckling-proof performances as a result of novel structural arrangement including provision of the viscoelastic members in which the inner peripheral regions of the rigid plates are embedded, provision of the cylindrical cavity extending along the laminated sectors of those viscoelastic members and rigid plates, and provision of either a viscoelastic body, or an elastic body, or viscous substance, whichever the one containing cubage greater than that of the cylindrical cavity, forcibly being inserted in the cylindrical cavity.

What is claimed is:

1. A laminated rubber bearing comprising; an external binding body consisting of a plurality of alternating rigid plates and rubber-like elastic plates with said rubber-like elastic plates disposed between external peripheral regions of said rigid plates; viscoelastic members disposed inside of said rubber-like elastic plates of said external binding body, interspaces between said rigid plates inside of said rubber-like elastic plates being filled with said viscoelastic members; a cylindrical cavity opening at both ends thereof and extending through said laminated viscoelastic members and rigid plates; and a viscoelastic body having a volume greater than that of said cylindrical cavity and forcedly being inserted in said cylindrical cavity.

2. A laminated rubber bearing comprising; an external binding body consisting of a plurality of alternating rigid plates and rubber-like elastic plates laminated with said rubber-like elastic plates between external peripheral regions of said rigid plates; viscoelastic members disposed inside of said rubber-like elastic plates of said external binding body interspaces between said rigid plates inside of said rubber-like plates being filled with said viscoelastic members; a cylindrical cavity opening at both ends thereof and extending through said laminated viscoelastic members and rigid plates; and an elastic body having a volume greater than that of said cylindrical cavity and forcedly being inserted in said cylindrical cavity.

3. A laminated rubber bearing comprising; an external binding body consisting of a plurality of alternating rigid plates and rubber-like elastic plates with said rubber-like elastic plates disposed between external peripheral regions of said rigid plates; viscoelastic members disposed inside of said rubber-like elastic plates of said external binding body interspaces between said rigid plates inside of said rubber-like elastic plates being filled with said viscoelastic members; a cylindrical cavity opening at both ends thereof and extending through said laminated viscoelastic members and rigid plates; and a viscous substance having a volume greater than that of said cylindrical cavity and forcedly being inserted in said cylindrical cavity.

4. The laminated rubber bearing as defined in claim 3, wherein a diffusion preventive film is interposed between said viscoelastic members and said viscous substance.

* * * * *